(12) United States Patent
Felder (10) Patent No.: US 7,104,684 B2
(45) Date of Patent: Sep. 12, 2006

(54) ON-CHIP DIGITAL THERMOMETER TO SENSE AND MEASURE DEVICE TEMPERATURES

(75) Inventor: Matthew D. Felder, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 10/718,769

(22) Filed: Nov. 22, 2003

(65) Prior Publication Data

US 2004/0105488 A1 Jun. 3, 2004

Related U.S. Application Data

(60) Provisional application No. 60/429,941, filed on Nov. 29, 2002.

(51) Int. Cl.
*G01K 7/01* (2006.01)
*G01K 7/16* (2006.01)

(52) U.S. Cl. .......................... 374/178; 374/183

(58) Field of Classification Search ................ 374/163, 374/170, 171, 172, 178, 183, 168, 185, 141, 374/152

See application file for complete search history.

(56) References Cited

U.S. PATENT DOCUMENTS

| | | | | |
|---|---|---|---|---|
| 4,161,880 A | * | 7/1979 | Prosky | 374/171 |
| 4,949,274 A | * | 8/1990 | Hollander et al. | 324/142 |
| 5,231,315 A | * | 7/1993 | Thelen, Jr. | 327/103 |
| 5,317,520 A | * | 5/1994 | Castle | 702/58 |
| 5,384,712 A | * | 1/1995 | Oravetz et al. | 702/62 |
| 5,424,707 A | * | 6/1995 | Ishikawa et al. | 338/22 SD |
| 5,453,682 A | * | 9/1995 | Hinrichs et al. | 324/132 |
| 5,459,671 A | * | 10/1995 | Duley | 702/63 |
| 5,781,075 A | * | 7/1998 | Bolton et al. | 331/176 |
| 6,092,926 A | * | 7/2000 | Still et al. | 374/141 |
| 6,240,371 B1 | * | 5/2001 | Azar | 702/45 |
| 6,380,726 B1 | * | 4/2002 | Szabo | 324/115 |
| 6,480,127 B1 | * | 11/2002 | Aslan | 341/119 |
| 6,674,185 B1 | * | 1/2004 | Mizuta | 374/170 |
| 6,679,628 B1 | * | 1/2004 | Breinlinger | 374/178 |
| 2001/0055231 A1 | * | 12/2001 | Tsuruta | 365/202 |
| 2004/0114667 A1 | * | 6/2004 | Sumimoto et al. | 374/185 |

* cited by examiner

*Primary Examiner*—G. Bradley Bennett
(74) *Attorney, Agent, or Firm*—Garlick Harrison & Markison; Robert A. McLauchian, III (57) ABSTRACT

A system and method for sensing the temperature of a device. This includes the establishment of a programmable current from an on-chip source, which in turn is used to produce a temperature dependent voltage from a temperature dependent resistive device. The temperature dependent resistive device is thermally coupled to a device for which the temperature is to be sensed. The temperature dependent voltage produced is converted to a digital value and equated to the temperature of the device.

36 Claims, 11 Drawing Sheets

FIG. 1 DIGITAL THERMOMETER CIRCUIT 10
PRIOR ART

FIG. 2

FIG. 3
MULTI-FUNCTION HANDHELD DEVICE 100

FIG. 4
ON-CHIP DIGITAL THERMOMETER 120

FIG. 5
ON-CHIP DIGITAL THERMOMETER 120

FIG. 6
PROGRAMMABLE CURRENT SOURCE 184

FIG. 9
THERMISTOR CURVE

ON-CHIP DIGITAL THERMOMETER TO SENSE AND MEASURE DEVICE TEMPERATURES

RELATED APPLICATIONS

This application claims priority under 35 USC § 119(e) to U.S. Provisional Patent Application Ser. No. 60/429,941 filed Nov. 29, 2002 entitled, "MULTI-FUNCTION HANDHELD DEVICE", and is incorporated herein by reference in its entirety.

TECHNICAL FIELD OF THE INVENTION

The present invention relates generally to temperature measuring systems and methods, and more particularly to a system and method for measuring temperature with an integrated circuit having a digital thermometer.

BACKGROUND OF THE INVENTION

Figure 1:
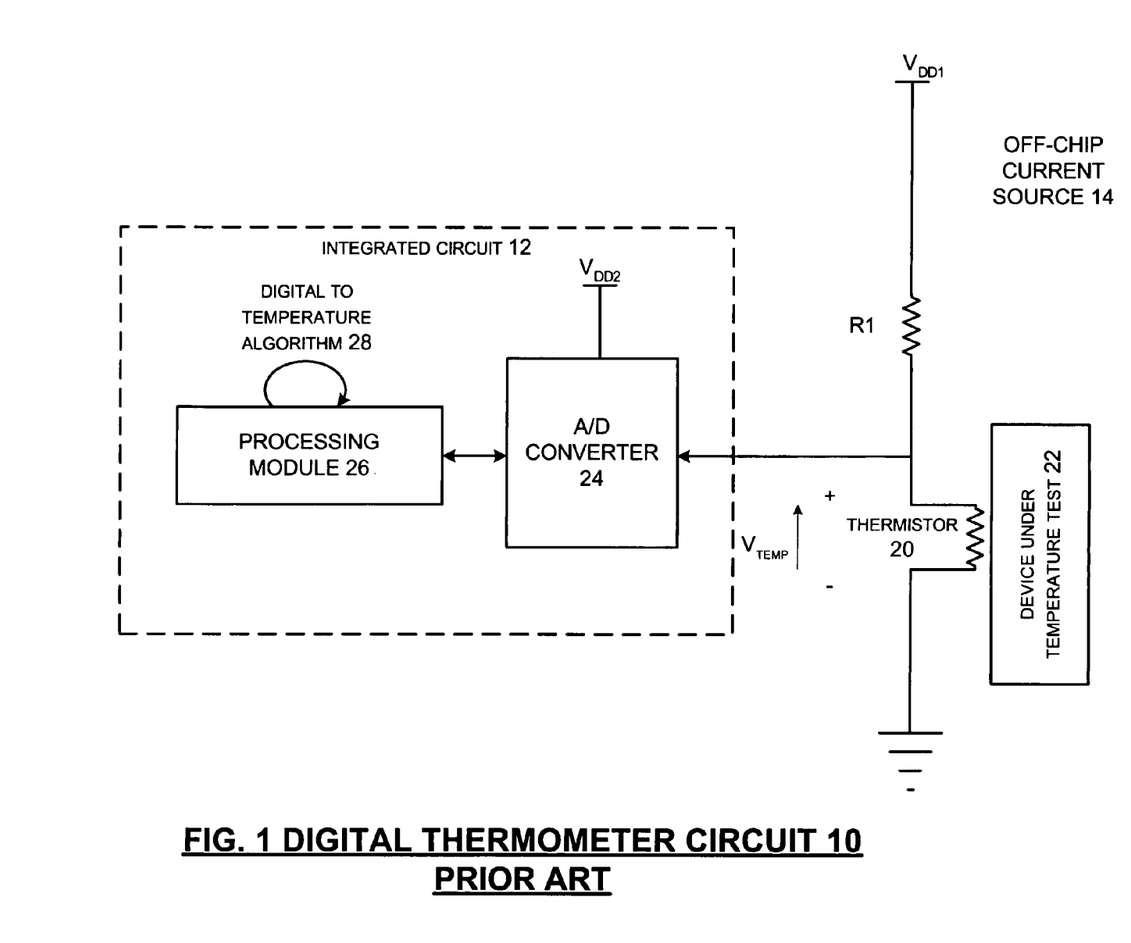
FIG. 1 is a schematic block diagram of a digital thermometer.

As is known, many electronic devices are temperature sensitive, (i.e., must be operated in a given temperature range to ensure proper operation). Accordingly, such electronic devices typically include a temperature sensing circuit. If the electronic device includes integrated circuits, a portion of the temperature sensing circuit is on-chip. FIG. 1 illustrates such an on-chip temperature sensing circuit. As shown, FIG. 1 provides a temperature sensing circuit 10 located within an integrated circuit 12. Thermistor 20 is thermally coupled to the device under temperature test 22. Resistor R1 and thermistor 20 form a voltage-dividing network. Voltage $V_{temp}$ across thermistor 20 is sensed by an Analog to digital (ADC) 24. ADC 24 generates a digital valve of the sensed voltage. Processing module 26 uses algorithms 28 to convert the digital valve of ADC 24 into an actual temperature reading.

This arrangement has a number of disadvantages. The resistor divider approach requires a extra resistor, has poor power supply rejection, and lacks the ability to dynamically alter the divider to account for the large impedance range of a typical thermistor. As this arrangement does not provide the ability to adjust the range of voltage $V_{temp}$ sensed by ADC 24, this arrangement lacks the ability to take full advantage of the sensing resolution of ADC 24.

The temperature sensing circuit of FIG. 1 measures the temperature of electronic device or components with limitations. Such limitations include a limited temperature sensitive range. This is particularly true when employing a thermistor that has a resistance value exponential with respect to temperature. When using the resistor divider method this exponential response usually restricts the resistor divider to be used only within a narrow temperature range. The voltage-dividing network in this case is optimized due to ADC dynamic range limits for a particular temperature to be sensed across thermistor 20. Thus, when not operating in the optimal range the resolution of the sensed temperature provided by the measured voltage $V_{temp}$ is severely limited. Additionally, power supply noise issues and component count further hamper this type of arrangement.

Therefore, a need exists for an on-chip temperature sensing circuit that has a wide temperature sensing range and reduced external part count.

SUMMARY OF THE INVENTION

A temperature sensing circuit located on an integrated circuit in accordance with the present invention substantially meets these needs and others. The temperature sensing circuit provides a system and method for sensing the temperature of a device by establishing a programmable current from an on-chip current source. This programmable current is supplied to a temperature-dependent resistive device (e.g. a thermistor), which in turn is thermally coupled to the device for which the temperature is to be sensed. Such a method and apparatus provide an on-chip temp circuit that has a wide temperature sensing range with a reduced external part count. The temperature-dependent resistive device generates a temperature-dependent voltage based on the programmable current. The temperature-dependent voltage is sensed and converted to a digital value. This digital value then is equated to the temperature of the device.

The programmable current may be adjusted such that the temperature-dependent voltage falls within a dynamic range of the ADC.

In another embodiment, a network of switches provide the programmable current to one of a number of temperature-dependent resistive devices operably coupled to a number of devices for which the temperature will be sensed. A sensed voltage is then processed such that the voltage associated with each individual temperature-dependent resistive device is converted to a digital value and equated to the temperature of its corresponding device.

In yet another embodiment, an on-chip digital thermometer used to measure the temperature of devices, utilizes an on-chip programmable current source to provide a current output having a programmable value. An analog-to-digital converter (ADC) may be operably coupled to sample a temperature-dependent voltage produced by a temperature-dependent resistive device and the current output. The ADC converts the temperature-dependent voltage to a digital value, which an on-chip processing module receives and equates to the temperature of the off-chip device.

DETAILED DESCRIPTION OF THE INVENTION

Figure 2:
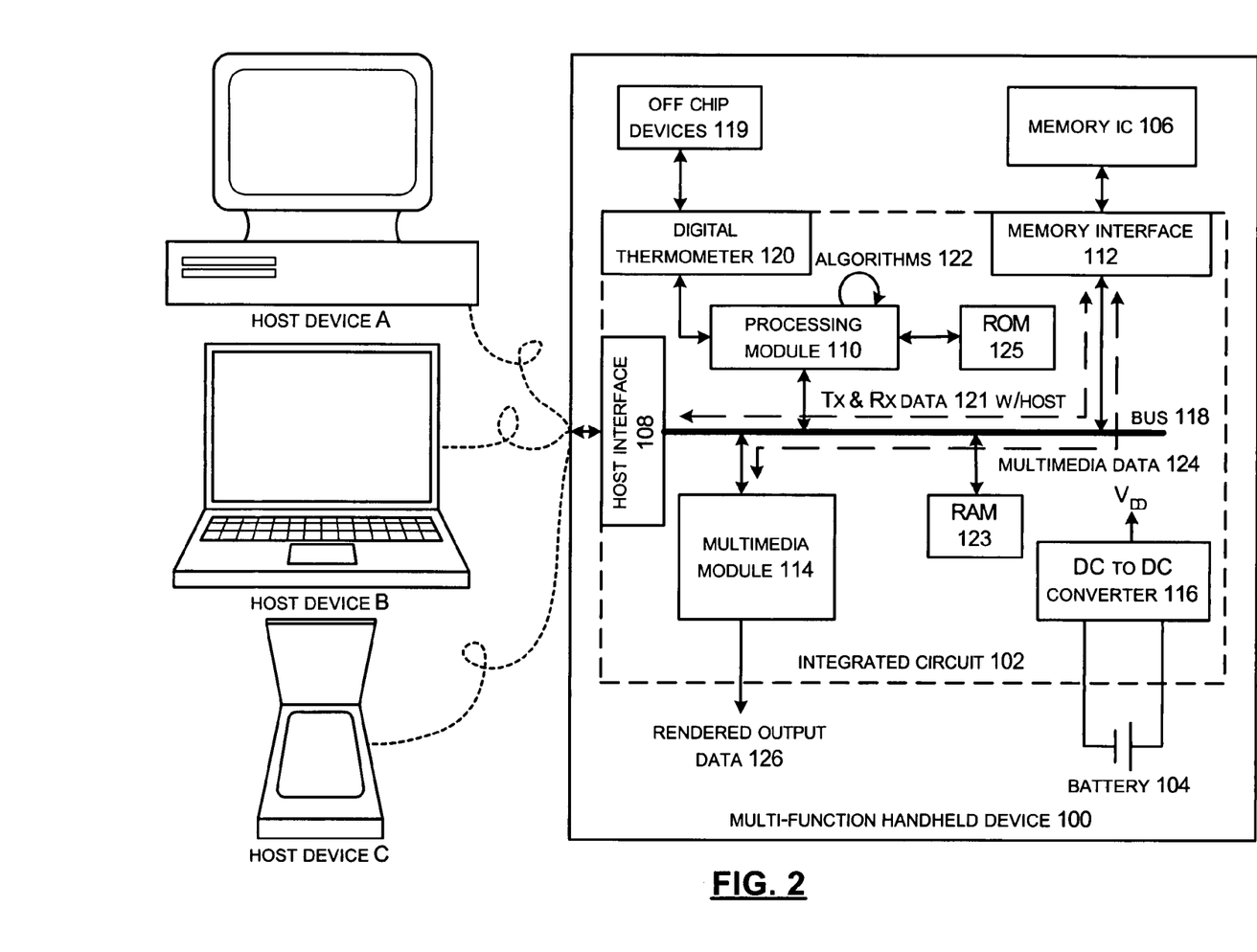
FIG. 2 is a schematic block diagram of a handheld device and corresponding integrated circuit in accordance with the present invention.

FIG. 2 is a schematic block diagram of a multi-function handheld device 100 and corresponding integrated circuit 102 operably coupled to a host device A, B, or C. The multi-function handheld device 100 includes memory integrated circuit (IC) 106 and a battery 104. Integrated circuit 102 includes a host interface 108, a processing module 110, a memory interface 112, a multimedia module 114, a DC-to-DC converter 116, a digital thermometer 120, which will be discussed in greater detail with reference to FIGS. 4–12, and bus 118. The multimedia module 114 alone or in combination with the processing module 110 provides the functional circuitry for the integrated circuit 102. The DC-to-DC converter 116, which may be constructed in accordance with the teaching of U.S. Pat. No. 6,204,651, entitled METHOD AND APPARATUS FOR REGULATING A DC VOLTAGE, provides at least a first supply voltage to one or more of the host interface 108, the processing module 110, the multimedia module 114, and the memory interface 112. The DC-to-DC converter 116 may also provide $V_{DD}$ to one or more of the other components of the handheld device 10.

When the multi-function handheld device 100 is operably coupled to a host device A, B, or C, which may be a personal computer, workstation, server (which are represented by host device A), a laptop computer (host device B), a personal digital assistant (host device C), and/or any other device that may transceive data with the multi-function handheld device, the processing module 110 performs at least one algorithm 122, which will be described in greater detail with reference to FIGS. 7, 8, 11, and 12, where the corresponding operational instructions of the algorithm 122 are stored in memory 106 and/or in memory incorporated in the processing module 110. Processing module 110 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 110 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 100 in the first functional mode, the integrated circuit 102 facilitates the transfer of data between the host device A, B, or C and memory 106, which may be non-volatile memory (e.g., flash memory, disk memory, SDRAM) and/or volatile memory (e.g., DRAM). In one embodiment, the memory IC 106 is a NAND flash memory that stores both data and the operational instructions of at least some of the algorithms 122. The interoperability of the memory IC 106 and the integrated circuit 102 will be described in greater detail with reference to FIGS. 7, 8, 11 and 12.

In this mode, the processing module 110 retrieves a first set of operational instructions (e.g., a file system algorithm, which is known in the art) from the memory 106 to coordinate the transfer of data. For example, data received from the host device A, B, or C (e.g., Rx data) is first received via the host interface module 108. Depending on the type of coupling between the host device and handheld device 100, the received data will be formatted in a particular manner. For example, if the handheld device 100 is coupled to the host device via a universal serial bus (USB) cable, the received data will be in accordance with the format proscribed by the USB specification. The host interface module 108 converts the format of the received data (e.g., USB format) into a desired format by removing overhead data that corresponds to the format of the received data and storing the remaining data as data words. The size of the data words generally corresponds directly to, or a multiple of, the bus width of bus 108 and the word line size (i.e., the size of data stored in a line of memory) of memory 106. Under the control of the processing module 110, the data words are provided, via the memory interface 112, to memory 106 for storage. In this mode, the handheld device 100 functions as extended memory of the host device (e.g., like a thumb drive).

In furtherance of the first functional mode, the host device may retrieve data (e.g., Tx data) from memory 106 as if the memory were part of the computer. Accordingly, the host device provides a read command to the handheld device, which is received via host interface 108. Host interface 108 converts the read request into a generic format and provides the request to processing module 110. Processing module 110 interprets the read request and coordinates the retrieval of the requested data from memory 106 via the memory interface 112. The retrieved data (e.g., Tx data) is provided to the host interface 108, which converts the format of the retrieved data from the generic format of the handheld device into the format of the coupling between the handheld device and the host device. The host interface 108 then provides the formatted data to the host device via the coupling.

The coupling between the host device and the handheld device may be a wireless connection or a wired connection. For instance, a wireless connection may be in accordance with Bluetooth, IEEE 802.11 (a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 108 includes a corresponding encoder and decoder. For example, when the handheld device 100 is coupled to the host device via a USB cable, the host interface module 108 includes a USB encoder and a USB decoder.

As one of average skill in the art will appreciate, the data stored in memory 106, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. As one of average skill in the art will further appreciate, when the handheld device 100 is coupled to the host device A, B, or C, the host device may power the handheld device 100 such that the battery is unused.

When the handheld device 100 is not coupled to the host device, the processing module 110 executes algorithms 122 to detect the disconnection and to place the handheld device in a second operational mode. In the second operational mode, the processing module 110 retrieves, and subsequently executes, a second set of operational instructions from memory 106 to support the second operational mode. For example, the second operational mode may correspond to MP3 file playback, digital dictaphone recording, MPEG file playback, JPEG file playback, text messaging display, cellular telephone functionality, and/or AM/FM radio reception. Each of these functions is known in the art, thus no further discussion of the particular implementation of these functions will be provided except to further illustrate the concepts of the present invention.

In the second operational mode, under the control of the processing module 110 executing the second set of operational instructions, the multimedia module 114 retrieves multimedia data 124 from memory 106. The multimedia data 124 includes at least one of digitized audio data, digital video data, and text data. Upon retrieval of the multimedia data, the multimedia module 114 converts data 124 into rendered output data 126. For example, multimedia module 114 may convert digitized data into analog signals that are subsequently rendered audible via a speaker or via a headphone jack. In addition, or in the alternative, the multimedia module 114 may render digital video data and/or digital text data into RGB (red-green-blue), YUV, etc., data for display on an LCD (liquid crystal display) monitor, projection CRT, and/or on a plasma type display. Multimedia module 114 will be described in greater detail with reference to FIG. 3.

As one of average skill in the art, the handheld device 100 may be packaged similarly to a thumb drive, a cellular telephone, pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 3:
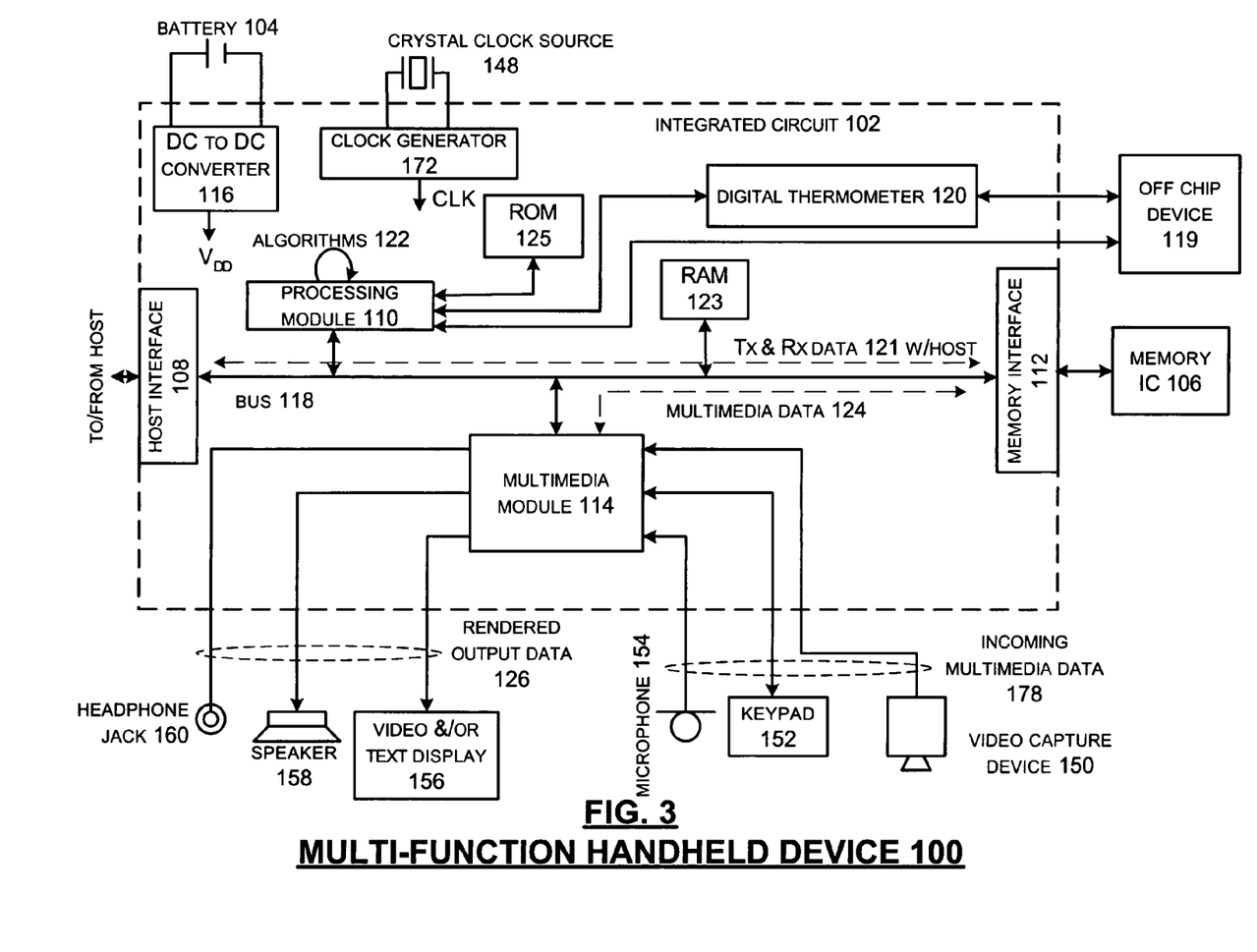
FIG. 3 is a second schematic block diagram of a second handheld device in corresponding integrated circuit in accordance with the present invention.

FIG. 3 is a schematic block diagram of another handheld device 100 and a corresponding integrated circuit 102. In this embodiment, the handheld device 100 includes the integrated circuit 102, the battery 104, the memory 106, a crystal clock source 148, one or more multimedia input devices (e.g., one or more video capture device(s) 150, keypad(s) 152, microphone(s) 154, etc.), and one or more multimedia output devices (e.g., one or more video and/or text display(s) 156, speaker(s) 158, headphone jack(s) 160, etc.). The integrated circuit 102 includes host interface 108, the processing module 110, the memory interface 112, the multimedia module 168, the DC-to-DC converter 116, a clock generator 172, which produces a clock signal (CLK) for use by the other modules, and a digital thermometer 120 used to monitor the temperature of devices 119. As one of average skill in the art will appreciate, the clock signal CLK may include multiple synchronized clock signals at varying rates for the various operations of the multi-function handheld device.

Handheld device 100 functions in a similar manner as handheld device 100 when exchanging data with the host device (i.e., when the handheld device is in the first operational mode). In addition, while in the first operational mode, the handheld device 100 may store digital information received via one of the multimedia input devices 150, 154, and 152. For example, a voice recording received via the microphone 154 may be provided as multimedia input data 178, digitized via the multimedia module 168 and digitally stored in memory 106. Similarly, video recordings may be captured via the video capture device 150 (e.g., a digital camera, a camcorder, VCR output, DVD output, etc.) and processed by the multimedia module 168 for storage as digital video data in memory 106. Further, keypad 152 (which may be a keyboard, touch screen interface, or other mechanism for inputting text information) provides text data to the multimedia module 168 for storage as digital text data in memory 106. In this extension of the first operational mode, the processing module 110 arbitrates write access to the memory 106 among the various input sources (e.g., the host and the multimedia module).

When the handheld device 102 is in the second operational mode (i.e., not connected to the host), the handheld device may record and/or playback multimedia data stored in the memory 106. Note that the data provided by the host when the handheld device 100 was in the first operational mode includes the multimedia data. The playback of the multimedia data is similar to the playback described with reference to the handheld device 100 of FIG. 2. In this embodiment, depending on the type of multimedia data 124, the rendered output data 182 may be provided to one or more of the multimedia output devices. For example, rendered audio data may be provided to the headphone jack 160 an/or to the speaker 158, while rendered video and/or text data may be provided to the display 156.

Handheld device 100 may also record multimedia data 124 while in the second operational mode. For example, the handheld device 100 may store digital information received via one of the multimedia input devices 150, 152, and 154.

Figure 4:
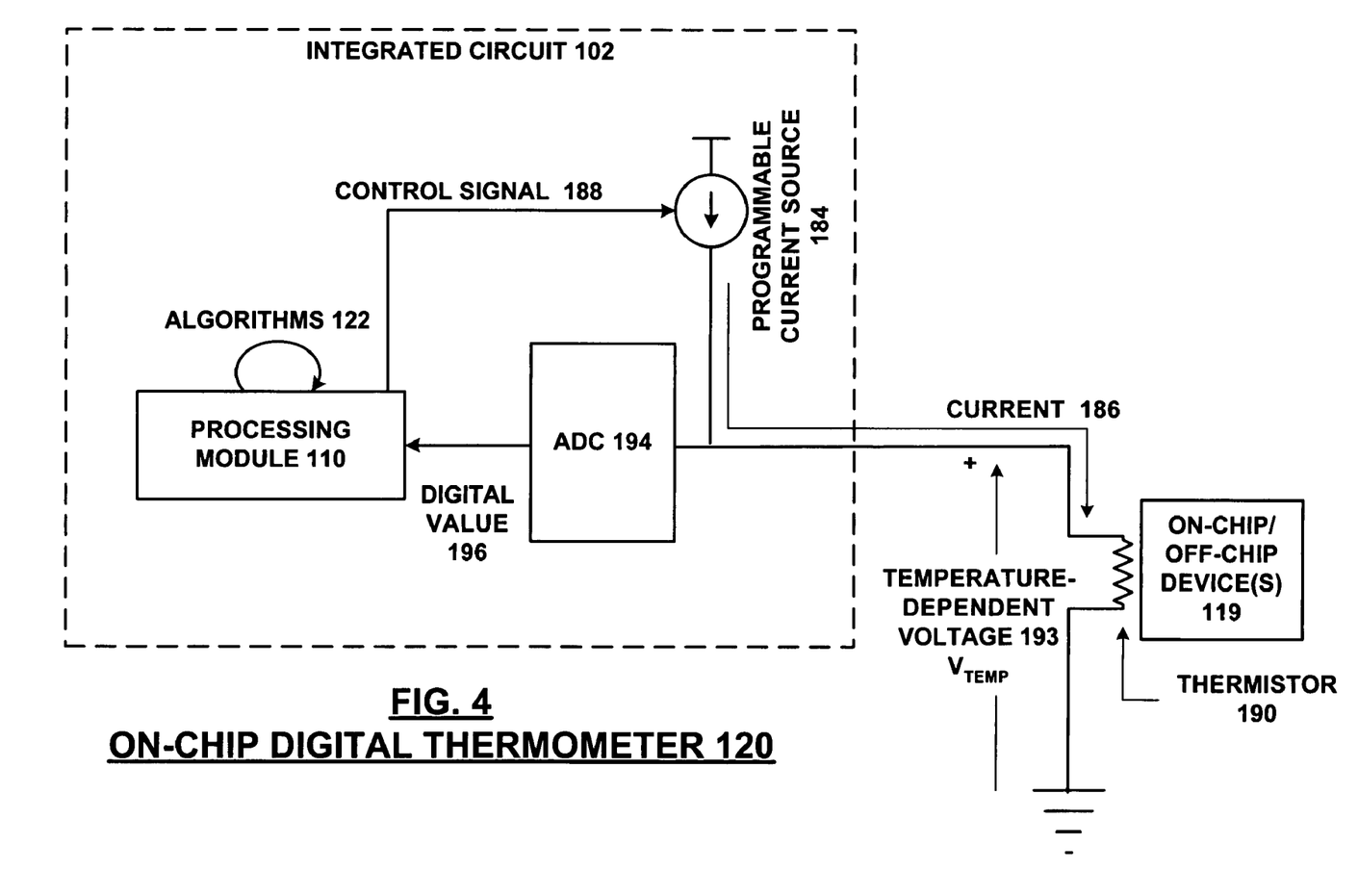
FIG. 4 is a schematic block diagram of an embodiment of an on-chip digital thermometer in accordance with the present invention.
Figure 6:
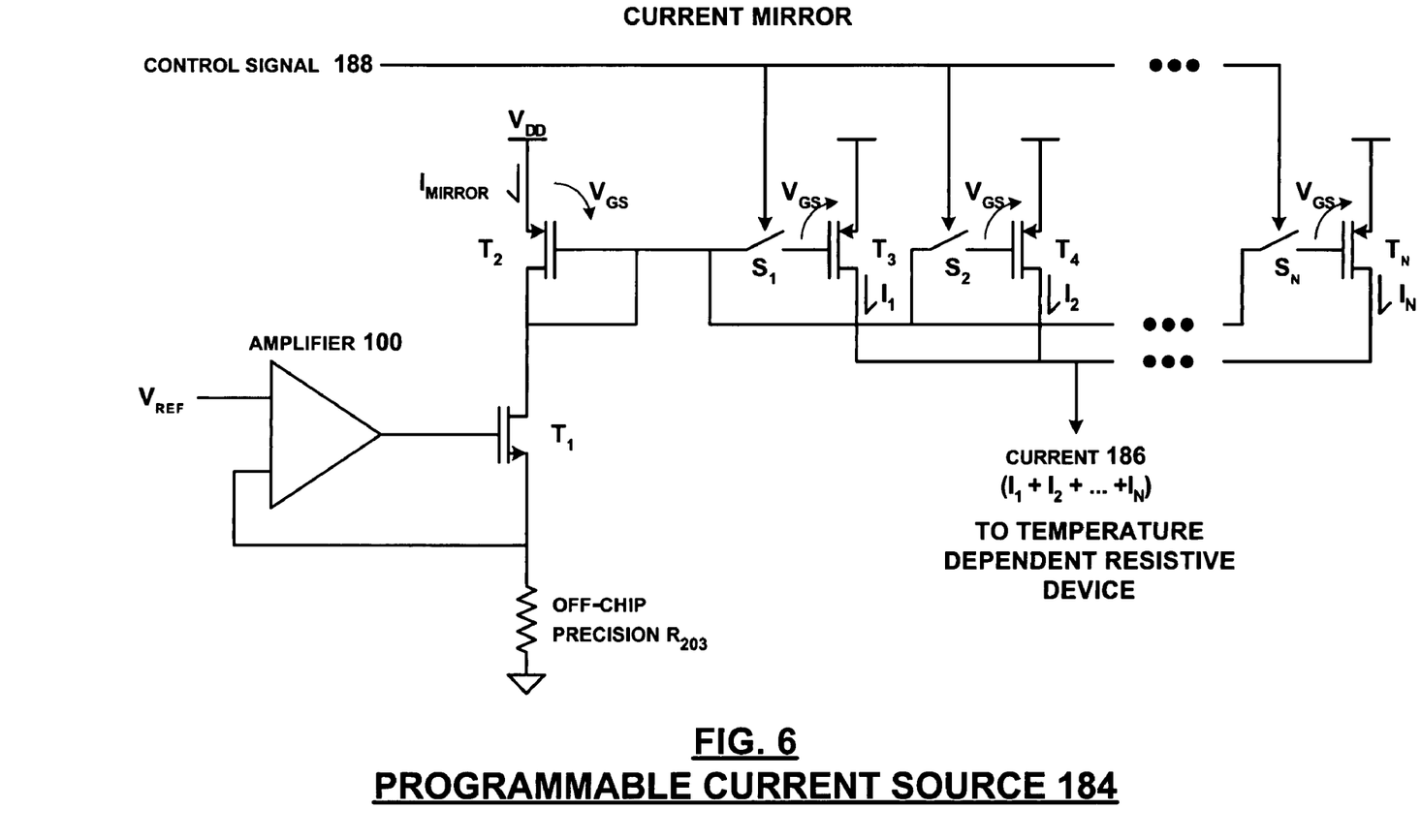
FIG. 6 is a schematic diagram of an embodiment of the programmable current source contained within FIGS. 4 and 5.

FIG. 4 depicts one embodiment of on-chip digital thermometer 120 located on integrated circuit 102. On-chip digital thermometer includes programmable current source 184, analog to digital converter (ADC) 194, and processing module 110. Algorithms 122 allow processing module 110 to supply a control signal 188 to programmable current source 184. The programmable current source 184 will be described in greater detail with reference to FIG. 6, provides reference current 186 to thermistor 190 on off chip device 119.

Programmable current source 184 sets the magnitude and waveform of reference current 186 based on a control signal 188 received from processing module 110. Programmable current source 184 provides current 186 to an off-chip temperature dependent resistive device (e.g. Thermistor 190 which is thermally coupled to device 119). Based on the temperature of device 119, thermistor 190 will have a unique impedance. The unique impedance produces a voltage Vtemp as current 186 flows through it.

ADC 194 converts $V_{TEMP}$ into digital value 196. If digital value 196 is within a predetermined range of values, control signal 188 maintains the output of programmable current source 184 at its present level. When digital value 196 is outside a predetermined range of values, control signal 188 directs programmable current source 184 to alter current 186 such that digital value is within the predetermined range of values. For example, when digital value 196 is beneath the predetermined range of values, control signal 188 directs the programmable current source to increase current 186. Similarly, when digital value 196 is above the predetermined range of values, control signal 188 directs the programmable current source to decrease current 186.

Device 119 may be on-chip or off-chip, but should not be limited to devices that may include a hard-drive, battery, or other device whose operation is temperature dependent as is known to those skilled in the art. Temperature dependent voltage 119 results from dropping current 186 across thermistor 190. ADC 194 senses this temperature dependent voltage 119. It should be noted that thermistor 190 illustrates just one possible temperature-dependent resistive device, which may be thermally coupled to device 119 in order to produce a temperature dependent voltage 119. ADC 194 senses the temperature dependent voltage 119 to produce a digital value 196. Processing module 110 uses algorithms 122 to equate digital value 196 to a specific temperature reading in order to determine the temperature of device 119.

Processing module 110 may then execute instructions that control functions of device 119. For example, in the instance where device 119 is a battery, charging of the battery may not be initiated if the temperature determined from temperature-dependent voltage 193 falls outside a given temperature range. Additionally, processing module 110 may direct that the battery charge may be completed when a specific temperature change associated with the battery is observed.

Figure 5:
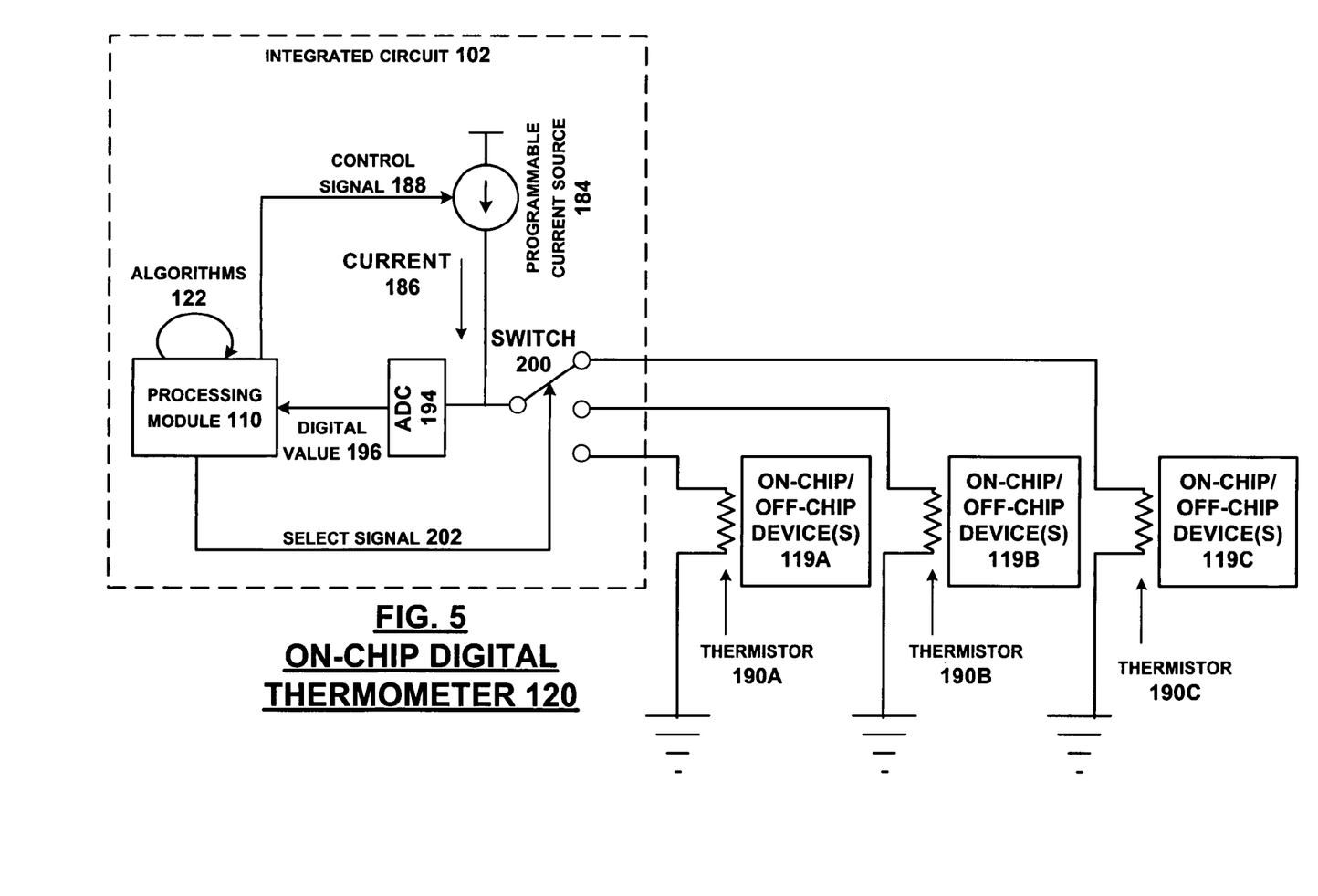
FIG. 5 is a schematic block second embodiment of an on-chip digital thermometer in accordance with the present invention.

FIG. 5 provides another embodiment of on-chip digital thermometer 120. In this instance, programmable current source 184 provides current 186 to one of a number of devices which may be on-chip or off-chip devices shown here as devices 119A, 119B and 119C. Each of these devices has a temperature dependent resistive device, illustrated here as thermistor 190A, 190B, and 190C, coupled to itself. In order to handle these multiple devices, switch 200, which is controlled by select signal 202, directs reference current 186 to the individual temperature-dependent resistive devices. Switch 200 also allows ADC 194 to sense each of the individual temperature-dependent voltages 193A, 193B and 193C associated with the devices 119A, 119B and 119C, respectively. As the temperature range associated with these devices may vary, processing module 110 sends information contained in select signal 202 to programmable current source 184. Information contained in select signal 202 is coordinated with control signal 188 such that current 186 provided to the temperature-dependent resistive devices will result in $V_{TEMP}$ being within a predetermined range of values when sensed by ADC 194. This optimizes the resolution and sensing ability of ADC 194. As previously discussed, digital value 196 is applied from ADC 194 to processing module 110, which is then equated with a temperature reading by algorithms 188. Algorithms 188 may entail correlating digital value 196 to a specific temperature in tables accessed by the algorithms or the calculation of the temperature based on the properties of the temperature dependent resistive device and a predetermined function. One such predetermined function is illustrated by several equations. First, the resistance equation for a thermistor is:

$R(T)=Ro*exp(Beta/T-Beta/To)$ wherein:

Ro is resistance at room temp and To is room temp (in Kelvin)

For a thermistor with Ro=33K and Beta=4090
  at 0C (273K) R=116 kohm
  at 100C (373K) R=2.1 kohm A second equation allows the temperature to be calculated when the properties of the thermistor are known.

$Temp=[1/((ln(Index/(16*Ro))/Beta)+0.00336)]-273$
wherein:

Temp is the Temperature of the Off-Chip Device in Celsius;

Index is an input to a look-up table to determine the temperature based on the parameters, wherein Index is based on the digital ADC results and the programmed current value;

Ro is a resistance of the thermistor in KILOOHMS at 298K;

Beta is a thermistor value.

Processing module 110 may direct programmable current source 184 to increase or decrease the value of programmable current 186 when the digital value 196 increases above or decreases below an upper and lower threshold value respectively in order to maintain $V_{TEMP}$ within the predetermined range of values.

FIG. 6 provides a more detailed embodiment of the circuits associated with programmable current source 184. Amplifier 100, $R_{203}$ and $T_1$ produce a precision current for $T_2$, which functions as a current mirror for $T_3$–$T_n$. Accordingly, based on size scaling between $T_2$, $T_3$ ... $T_n$, the same, or a scaled, current will flow through $T_2$ ... $T_n$ when its corresponding switch $S_1$ ... $S_n$ is closed by control signal 188. Currents through $T_2$ ... $T_n$ are summed together to produce current 186. FIG. 6 illustrates just one embodiment wherein a networked series of currents are summed to produce a reference current of the desired magnitude.

Figure 7:
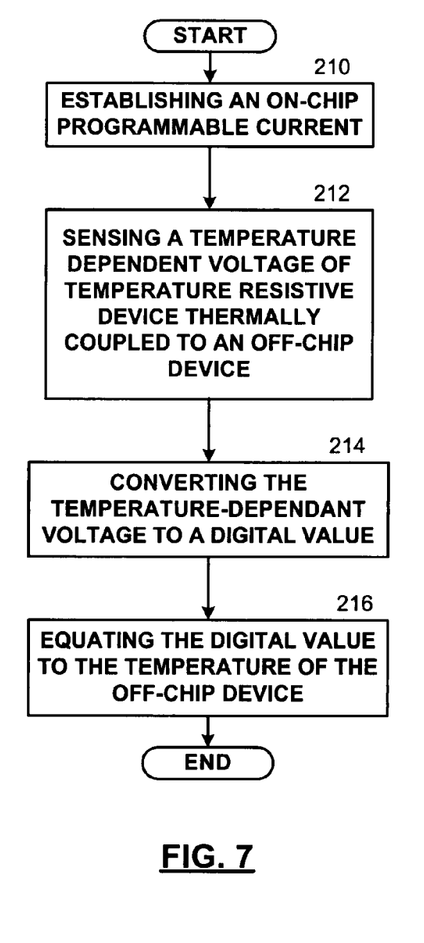
FIG. 7 is a logic diagram of a method for establishing a programmable current in determining the temperature of a device in accordance with the present invention.

FIG. 7 is a logic diagram of a method to determine the temperature of a device using an on-chip digital thermometer. The method begins at Step 210 where an on-chip programmable current is established from an on-chip current source. The current is set based on the predetermined range of values. The programmable current is provided to a temperature-dependent resistive device that is thermally coupled to the device for which the temperature is to be measured to produce a temperature dependent voltage. At Step 214, the temperature dependent voltage is converted into a digital value, which in Step 216 is equated to the temperature of the off-chip device.

Figure 8:
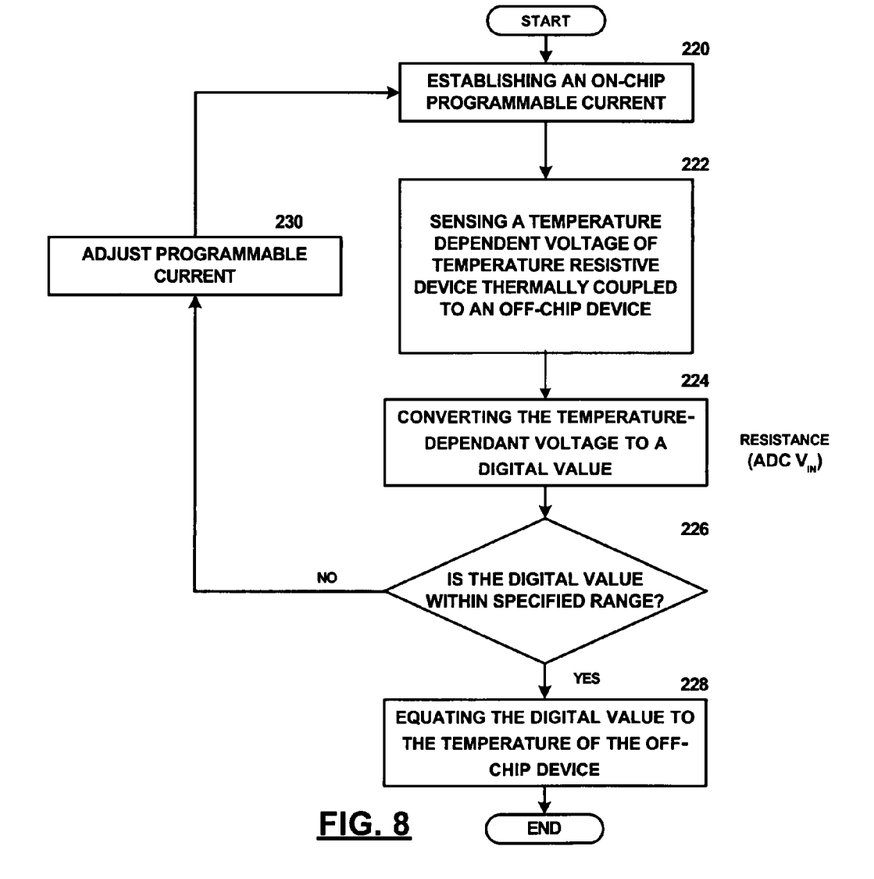
FIG. 8 is a logic diagram of a method that adjusts and establishes the programmable current to determine the temperature of a device in accordance with the present invention.

FIG. 8 is a logic diagram of another method to determine the temperature of a device using an on-chip digital thermometer. At Step 220, an on-chip programmable current is established by an on-chip current source. This programmable current is supplied to a temperature-dependent resistive device thermally coupled to a device for which the temperature is to be sensed to produce a temperature dependent voltage at step 222. The temperature dependent voltage is converted to a digital value at process Step 224. At decision point 226, a determination is made as to whether or not the digital value is within a specified range. If digital value is within a specified range, the digital value is then equated to a temperature measurement in Step 228. If the voltage is not within the predetermined range of values, in Step 230 the programmable current is adjusted and established at a new level and the process returns to Step 220.

Figure 9:
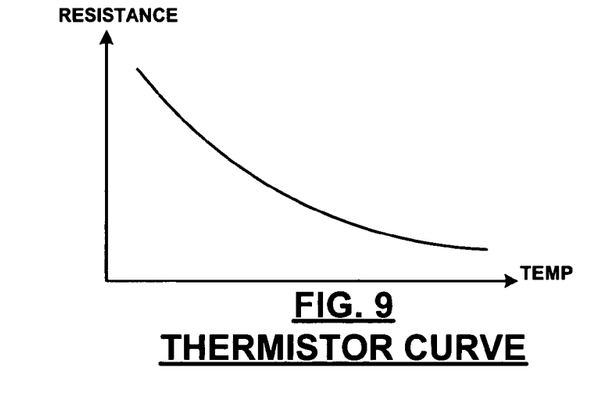
FIG. 9 is a graph of resistance versus temperature curve of a temperature dependent resistive device.

FIG. 9 is a graph that depicts a relationship between resistance and temperature of one temperature-dependent resistive device (e.g. thermistor). As shown, the resistance of a thermistor exponentially decreases with temperature.

Figure 10:
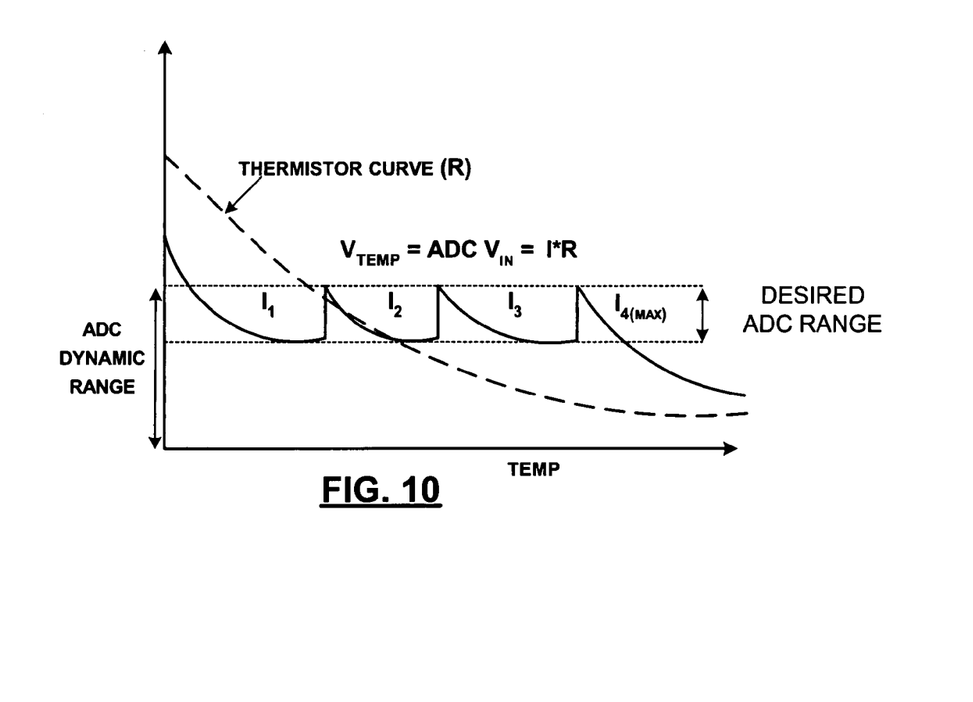
FIG. 10 is a graph of voltage versus temperature as the current is adjusted in accordance with the present invention.

FIG. 10 is a graph that depicts a relationship between the input voltage of the ADC ($V_{TEMP}$) and temperature. In this graph, the ADC voltage is equal to the programmable current multiplied by the resistance of the temperature-dependent resistive device. As shown, the curve is broken into four sections. In section one, the programmable current $I_1$ is applied to the temperature-dependent resistive device to produce $V_{TEMP}$. As the temperature of the device increases, the resistance and voltage decrease. This relationship requires that the current be increased to remain within the predetermined range of values (desired range of the ADC). In this state, the temperature of the device is relatively low. Hence the impedance is high and requires the current be smaller. As the resistance and voltage decrease the current is increased to $I_2$ in order to maintain the voltage at the ADC within a predetermined range. When the voltage produced by current $I_2$ decreases below the desired voltage range, the current is further increased to provide current $I_3$ such that the voltage in range 3 again falls within the predetermined range of values. Section 4 illustrates that if current $I_4$ is at the maximum value, $V_{TEMP}$ may fall beneath the desired range. As such, the effective temperature sensing range and sensitivity of an on-chip digital thermometer is increased by varying the applied current.

Figure 11:
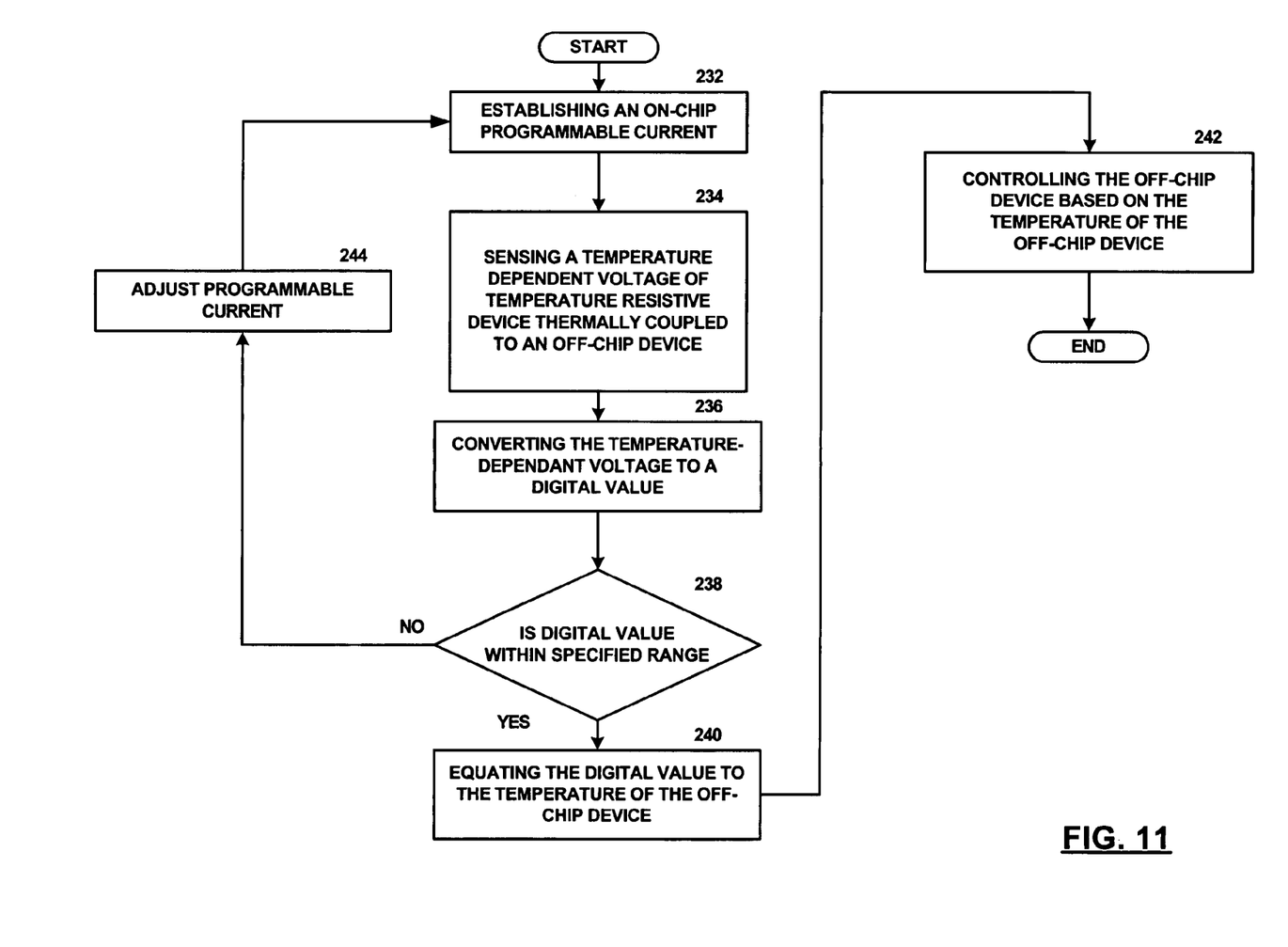
FIG. 11 is a logic diagram of a method that establishes and adjusts a programmable current to determine a temperature of a device, and controls that device based on its temperature.

FIG. 11 is a logic diagram of another method in which the device is controlled based on its sensed temperature. At process Step 232 an on-chip programmable current is established and applied to a temperature-dependent resistive device thermally coupled to the device. The application of this current produces a temperature-dependent voltage, which is sensed at step 234. At step 236 the temperature dependent voltage is converted into a digital value. If the digital value is within the desired range at decision point 238, the digital value is equated to the temperature of the device under test at Step 240. Step 242 allows for the device itself to be controlled based on its temperature. For example, the availability of a battery or the execution of specific functions of a battery such as a battery charge may be executed and controlled based on the temperature. This is further detailed in FIG. 12. Similarly, a hard-drive may be activated or accessible while the temperature is within a given range.

Returning to decision point 238, if the voltage is not within the specified range, the programmable current is adjusted at process Step 244 and re-established as a new on-chip programmable current at Step 232.

Figure 12:
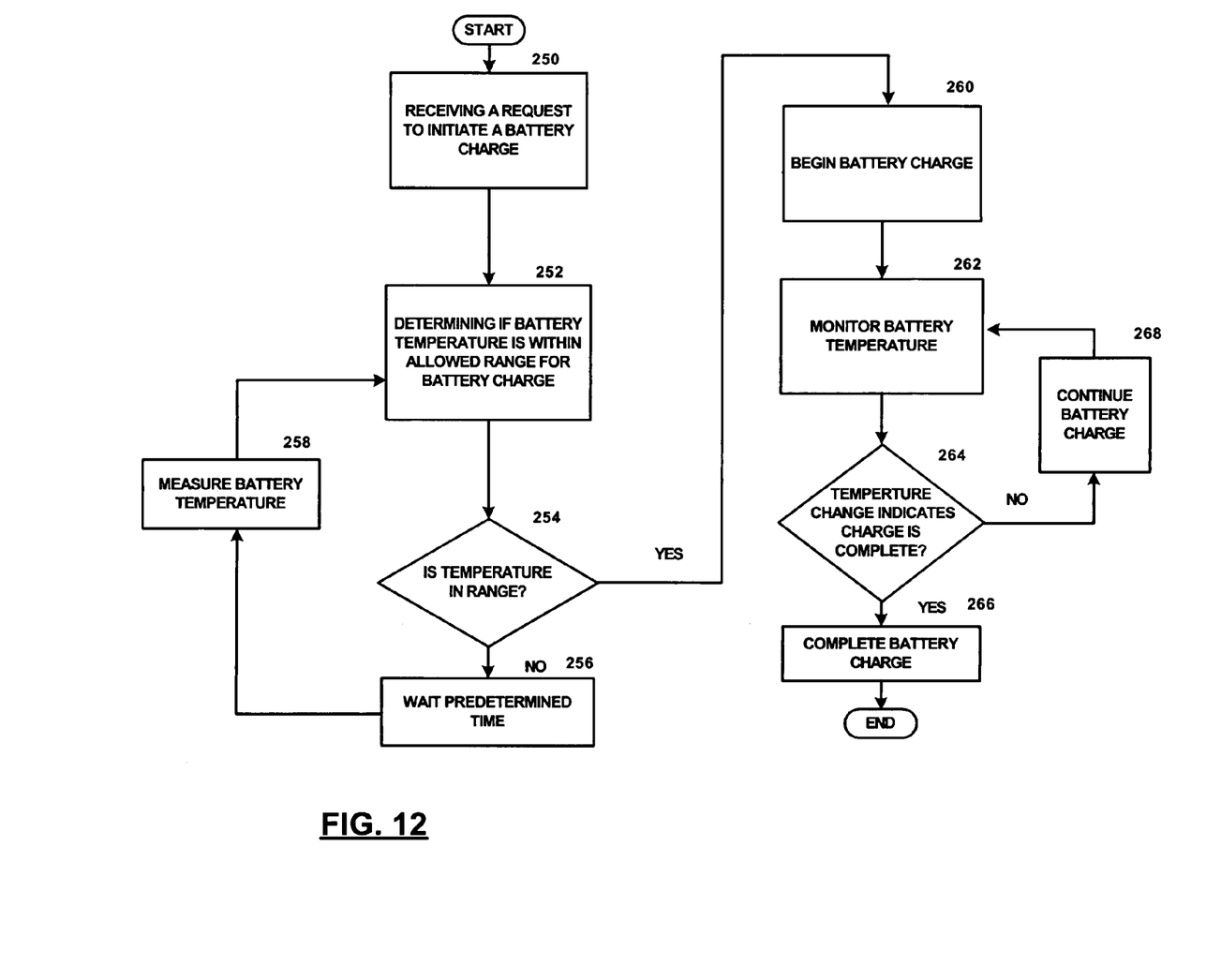
FIG. 12 is a logic diagram of a method that establishes and adjusts a programmable current to determine the temperature of a battery, and both initiates and controls functions of the battery based on the battery's temperature.

FIG. 12 is another logic diagram of a method in which applies the teachings of FIG. 11 to a battery and battery charge. At process Step 250, a battery charge request is received. Upon receiving this request a determination is made as to whether the battery temperature is within the allowed range for a battery charge in Step 252. The temperature is determined as described in FIG. 8. If the temperature is within the proper range at decision point 254 the battery charge is allowed to begin in process Step 260. Otherwise, the battery charge is not allowed. If the battery charge is not allowed, the process may wait a predetermined amount of time at Step 256 and then once more measure the battery temperature in Step 258.

As the battery charge continues, the digital thermometer monitors the battery temperature at Step 262 as described in FIG. 8. The measured temperature profile may indicate the completion of the charge. For example, in one type of battery, a 15° increase in battery temperature indicates the completion of the battery charge at decision 264. If the charge is not complete, the process at Step 268 directs that the battery charge continue and that its temperature continue to be monitored as the process returns to Step 262. If the temperature profile indicates that the charge is complete, the battery charge is stopped and completed at process Step 266.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method for sensing a temperature of a device, that comprises:
   establishing a programmable current for an on-chip current source;
   sensing a temperature-dependent voltage that is based on a temperature dependent resistive component and the programmable current, wherein the temperature-dependent voltage is maintained within a predetermined range, and wherein the temperature dependent resistive component is thermally coupled to the device;
   converting the temperature-dependant voltage to a digital value; and
   equating the digital value to the temperature of the device.

2. The method of claim 1 further comprises adjusting the programmable current such that the temperature-dependent voltage is within a predetermined range of values for converting the temperature-dependent voltage into the digital value, wherein the equating of the digital value is further based on the adjusting of the programmable current.

3. The method of claim 1, wherein the temperature dependent resistive component comprises a thermistor.

4. The method of claim 1, wherein the equating the digital value to the temperature of the device further comprises determining the temperature of the device from a table relating digital values to temperatures.

5. The method of claim 1, wherein the devices comprises an off-chip device, and wherein equating the digital value to the temperature of the off-chip device further comprises calculating the temperature of the off-chip device with a predetermined function wherein the temperature is a function of:

at least one property of the programmable current;
a digitized voltage; and
a set of physical properties of the temperature dependent resistive device.

6. The method of claim 5, wherein:
the temperature dependent resistive device comprises a thermistor; and
the predetermined function comprises the equation:

$$Temp=[1/((\mathit{In}(Index/(16*Ro))/Beta)+0.00336)]-273$$

wherein:
Temp is the Temperature of the Off-Chip Device in Celsius;
Index is a digital value derived from the digitized voltage and the programmable current;
Ro is a resistance of the thermistor in KILOOHMS at 298K Beta is a thermistor value.

7. The method of claim 1 further comprises:
increasing the programmable current when the digital value decreases below a lower threshold value; and
decreasing the programmable current when the digital value increases above an upper threshold value.

8. The method of claim 1, wherein the devices comprises an off-chip device, and wherein the off-chip device comprises at least one of:
a hard drive and a battery.

9. The method of claim 8 further comprises, when the device is a battery, controlling a battery charge function based on the temperature of the battery.

10. The method of claim 8 further comprises, when the device is a harddrive, controlling the harddrive based on the temperature of the harddrive.

11. The method of claim 1, that further comprises:
multiplexing the programmable current to a plurality of temperature dependent resistive devices coupled to a plurality of off-chip and/or on-chip devices;
measuring a voltage associated with each of the plurality of temperature dependent resistive devices coupled to the plurality of off-chip and/or on-chip devices;
converting each temperature-dependant voltage to a digital value; and
equating each digital value to the temperature of each of the plurality of off-chip and/or on-chip devices.

12. A digital thermometer to measure a temperature of an off-chip device that comprises:
an on-chip programmable current source to provide a current output;
an analog-to-digital converter operably coupled to sample a temperature-dependant voltage output produced by a temperature dependent resistive device and the current output and convert the temperature-dependent voltage output to a digital value; and
a processing module that receives the digital value and equates the digital value to the temperature of the off-chip device.

13. The digital thermometer of claim 12, wherein the processing module directs the on-chip programmable current source to:
increase the current output if the digital value decreases below a lower threshold value; and
decrease the current output if the digital value increases above an upper threshold value.

14. The digital thermometer of claim 12, wherein the analog-to-digital converter comprises a comparator.

15. The digital thermometer of claim 12, wherein the processing module auto-ranges the on-chip programmable current source so that the current output produces the temperature-dependent voltage output within a predetermined range.

16. The digital thermometer of claim 12, that further comprises:
a multiplexer that multiplexes the current output to a plurality of temperature dependent resistive devices coupled to a plurality of off-chip and/or on-chip devices; and
a demultiplexer that demultiplexes a plurality of temperature-dependant voltages to the analog-to-digital converter,
wherein the analog-to-digital converter converts each temperature-dependant voltage to a digital value; and
wherein the processing module equates each digital value to the temperature of each of the plurality of off-chip and/or on-chip devices.

17. The digital thermometer of claim 12, wherein the temperature dependent resistive device comprises a thermistor.

18. The digital thermometer of claim 12, wherein the processing module equates the digital value to the temperature of the off-chip device with a table relating digital values to temperatures.

19. The digital thermometer of claim 12, wherein the processing module equates the digital value to the temperature of the off-chip device by calculating the temperature of the off-chip device with a predetermined function wherein the temperature is a function of:
a current supplied by the on-chip current source;
a digitized voltage; and
a set of physical properties that define the temperature dependent resistive device.

20. The digital thermometer of claim 19, wherein:
the temperature dependent resistive device comprises a thermistor, and
the predetermined function comprises the equation:

$$Temp=[1/((\mathit{In}(Index/(16*Ro))/Beta)+0.00336)]-273$$

wherein:
Temp is the Temperature of the Off-Chip Device in Celsius;
Index is a digital value derived from the digitized voltage and the programmable current;
Ro is a resistance of the thermistor in KILOOHMS at 298K; and
Beta is a thermistor value.

21. The digital thermometer of claim 12, wherein the off-chip device comprises a hard drive.

22. The digital thermometer of claim 12, wherein the off-chip device comprises a battery.

23. The digital thermometer of claim 12, wherein the processing module controls a function of the off-chip device based on the temperature of the off-chip device.

24. The digital thermometer of claim 12, is located on an audio processing chip.

25. An audio processing chip, having a digital thermometer located thereon to measure a temperature of an off-chip device, that comprises:
an on-chip programmable current source to provide a current output;
a temperature dependent resistive device thermally coupled to the off-chip device, that receives the current output to produce a temperature-dependent voltage output;

an analog-to-digital converter to sample the temperature-dependent voltage output and convert the temperature-dependent voltage output to a digital value; and a processing module that receives the digital value and equates the digital value to the temperature of the off-chip device.

26. The audio processing chip of claim 25, wherein the processing module directs the on-chip programmable current source to:

increase the current output if the digital value decreases below a lower threshold value; and decrease the current output if the digital value increases above an upper threshold value.

27. The audio processing chip of claim 25, wherein the analog-to-digital converter comprises a comparator.

28. The audio processing chip of claim 25, wherein the processing module auto-ranges the on-chip programmable current source so that the current output produces the temperature-dependent voltage output within a predetermined range.

29. The audio processing chip of claim 25, that further comprises:

a multiplexer that multiplexes the current output to a plurality of temperature dependent resistive devices coupled to a plurality of off-chip and/or on-chip devices; and a demultiplexer that demultiplexes a plurality of temperature-dependant voltages to the analog-to-digital converter, wherein the analog-to-digital converter converts each temperature-dependant voltage to a digital value; and wherein the processing module equates each digital value to the temperature of each of the plurality of off-chip and/or on-chip devices.

30. The audio processing chip of claim 25, wherein the temperature dependent resistive device comprises a thermistor.

31. The audio processing chip of claim 25, wherein the processing module equates the digital value to the temperature of the off-chip device with a table relating digital values to temperatures.

32. The audio processing chip of claim 25, wherein the processing module equates the digital value to the temperature of the off-chip device by calculating the temperature of the off-chip device with a predetermined function wherein the temperature is a function of:

a current supplied by the on-chip current source;

a digitized voltage; and a set of physical properties that define the temperature dependent resistive device.

33. The audio processing chip of claim 32, wherein:

the temperature dependent resistive device comprises a thermistor; and the predetermined function comprises the equation:

$$\text{Temp}=[1/((ln(\text{index}/(16*Ro))/\text{Beta})+0.00336)]273$$

wherein:

Temp is the Temperature of the Off-Chip Device in Celsius;

Index is a digital value derived from the digitized voltage and the programmable current;

Ro is a resistance of the thermistor in KILOOHMS at 298K; and

Beta is a thermistor value.

34. The audio processing chip of claim 25, wherein the off-chip device comprises a hard drive.

35. The audio processing chip of claim 25, wherein the off-chip device comprises a battery.

36. The audio processing chip of claim 25, wherein the processing module controls a function of the off-chip device based on the temperature of the off-chip device.

* * * * *